United States Patent [19]
Deller

[11] Patent Number: 4,764,711
[45] Date of Patent: Aug. 16, 1988

[54] BACK EMF LOOP CLOSURE

[75] Inventor: Robert W. Deller, Bountiful, Utah

[73] Assignee: E-Systems, Inc., Dallas, Tex.

[21] Appl. No.: 93,030

[22] Filed: Sep. 4, 1987

[51] Int. Cl.[4] .......................... H02P 5/06; G05B 5/01
[52] U.S. Cl. .................................... 318/619; 318/331; 318/632
[58] Field of Search ............... 318/331, 317, 615, 616, 318/619, 652, 345 CA, 471, 472, 473, 632, 343

[56] References Cited

U.S. PATENT DOCUMENTS

| | | | |
|---|---|---|---|
| 3,617,844 | 11/1971 | Grygera | 318/331 |
| 3,705,337 | 12/1972 | Grabl | 318/331 |
| 3,737,748 | 6/1973 | Teders | 318/331 |
| 3,818,297 | 6/1974 | Ha et al. | 318/331 |
| 4,078,194 | 3/1978 | Johnson | 318/331 |
| 4,189,666 | 2/1980 | Tetsugu et al. | 318/331 |
| 4,218,640 | 8/1980 | Vialatte | 318/331 |
| 4,266,168 | 5/1981 | Anderson | 318/331 |
| 4,274,037 | 6/1981 | Soeda | 318/331 |
| 4,549,122 | 10/1985 | Berkopec et al. | 318/331 X |
| 4,549,125 | 10/1985 | Sonobe | 318/632 X |

FOREIGN PATENT DOCUMENTS

| | | | |
|---|---|---|---|
| 0154389 | 9/1983 | Japan | 318/331 |
| 0128881 | 7/1985 | Japan | 318/331 |

*Primary Examiner*—Bentsu Ro
*Attorney, Agent, or Firm*—Albert M. Crowder, Jr.

[57] ABSTRACT

The back emf voltage of a motor is extracted from the applied motor voltage and motor current by means of a control system including a back emf sensor, an adaptive motor resistance circuit, and a position integrator. In the back emf sensor a corrected motor resistance signal, iR, a motor inductance signal, L di/dt, and applied motor voltage, $V_m$, are input to a summing junction. The summing junction subtracts the motor resistance signal and the motor inductance signal from the applied motor voltage to compute the back emf voltage. To correct for variations in motor resistance, the adaptive motor resistance circuits demodulates and integrates the back emf voltage from the summing junction and the motor position signal input to the system. By integrating the back emf voltage from the back emf sensor in the position integrator a motor position output is obtained as a signal for servo position loop closure.

18 Claims, 2 Drawing Sheets

# BACK EMF LOOP CLOSURE

TECHNICAL FIELD

This invention relates to a control system for generating a a motor rate and motor position signal, and more particularly to a brushless DC motor control system for generating a motor rate and motor position signal based on a computed back emf voltage.

BACKGROUND OF THE INVENTION

Heretofore, in an electronically commutated DC motor, often called a "Brushless DC motor" or a BDCM, the position of the output shaft was determined from a feedback transducer for limited motion position control servos. Typical of such feedback transducers are linear variable differential transducers and rotary variable differential transducers both of which respond to mechanical position to generate a position feedback voltage to control the output shaft position.

One application where DC motors and feedback transducers have found extensive use is in direct drive hydraulic servo valves. Such servo valves are used for position control of a power actuator. In many such applications the environment surrounding the servo valve and in turn the motor itself varies erractically and over a wide range of conditions, such as from very low temperatures to very high temperatures. In such an environment many factors enter into the accuracy of the position control for the DC motor.

The present invention may be used for controlling the operation of small, brushless, variable output or variable speed motors for aircraft control applications. However, it will be apparent that the invention may be equally applied to industrial power motors.

One application of the control system of the present invention is the positioning of a torque motor driven spool valve. Typically, such a spool valve includes a movable member disposed within a bore having an inlet and outlet port to provide communication between a supply passage and a load passage in a controlled fashion in response to the application to a torque motor of a motor position signal. This torque motor is operatively interconnected with a valve member that is positioned in accordance with the motor position signal. It is the load passage of such spool valves that is connected to an actuator as described. Typical of U.S. Patents issued on inventions relating to spool valves is U.S. Pat. No. 3,040,768, entitled "Oscillating Valve". The control system of the present invention finds utility in connection with such servo valves.

DISCLOSURE OF THE INVENTION

In accordance with the present invention there is provided a control system for back emf position loop closure to position a DC motor. The control system includes a back emf sensor for generating a computed back emf voltage. This back emf voltage is computed by the emf sensor from an applied motor voltage, motor inductance, and corrected motor resistance. The corrected motor resistance is output from an adaptive motor-resistance circuit that responds to motor operational parameters. The motor operational parameters include a motor position drive signal and the computed back emf voltage. To generate an output varying with motor position an integrator circuit responds to the computed back emf voltage.

In one embodiment of the adaptive motor resistance circuit a demodulator responds to the motor position drive signal and the computed back emf voltage, both inputs passing through high pass filters, to generate a resistance gain factor. This resistance gain factor is a control signal to a variable gain network that has input thereto a signal varying with motor resistance. An output of the variable gain network is the corrected motor resistance.

Further, in accordance with the present invention there is provided a control system for back emf position loop closure to position a brushless DC motor. The control system includes a back emf sensor responsive to applied motor voltage and subtracts a corrected motor iR voltage and a motor L di/dt voltage from the applied motor voltage. The result of this subtraction is a computed back emf voltage. This back emf sensor also outputs the computed back emf voltage as a motor rate signal. The corrected motor iR voltage is generated in a motor-resistance circuit that responds to a motor position signal and the computed back emf voltage. Also, input to the motor-resistance circuit is the motor iR voltage that is corrected by the motor-resistance circuit. To generate an output varying with motor position, the computed back emf voltage is input to a position integrator circuit.

BRIEF DESCRIPTION OF THE DRAWINGS

For a more complete understanding of the present invention and the advantages thereof, reference is now made to the following description taken in conjunction with the accompanying drawings.

Referring to the drawing.

DETAILED DESCRIPTION

Figure 1:
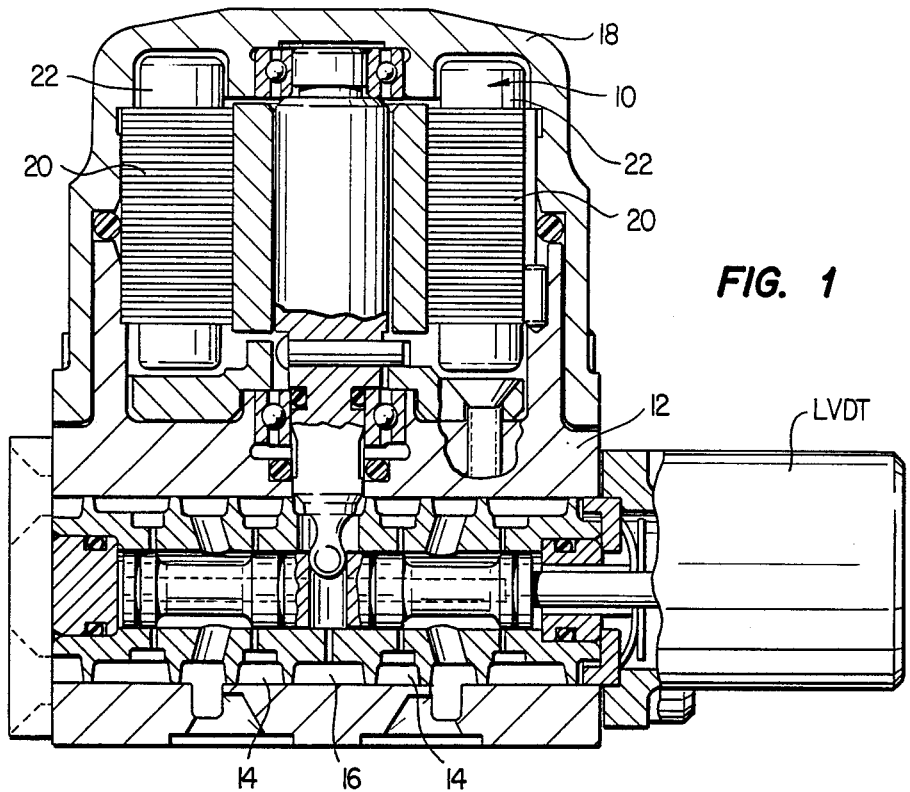
FIG. 1 is a cross sectional view of a direct drive servo valve responsive to the motor position drive voltage of the control system in accordance with the present invention.

Referring to FIG. 1, there is shown a direct drive servo valve including a drive motor 10 of a brushless DC type for use with the control system of the present invention. The servo valve of FIG. 1 is an example of where the control system of the present invention finds utility. However, it should be understood that the invention is not limited to the control of brushless DC motors in direct drive servo valves. The valve of FIG. 1 includes a housing 12 having supply ports 14 and returns ports 16 that allow the connection of the valve into various configurations in a system for fluid control. When the servo valve of FIG. 1 is used in a closed loop configuration, the housing 12 is typically fitted with a linear variable displacement transducer (LVDT). With the present invention this transducer may be utilized to generate an approximate position signal to the circuit of FIG. 2 as will be explained. The specific configuration of the valve does not form a part of this invention and further description of the spool and porting will not be given at this time.

Attached to the housing 12 is a drive assembly that includes the drive motor 10. As illustrated the drive motor includes a stator consisting of magnetic pole pieces 20 and drive windings 22. The drive windings are connected to receive a drive voltage from the control system of FIG. 2 as will be explained. It is this drive signal that controls the positioning of the spool within the valve housing 12.

Figure 2:
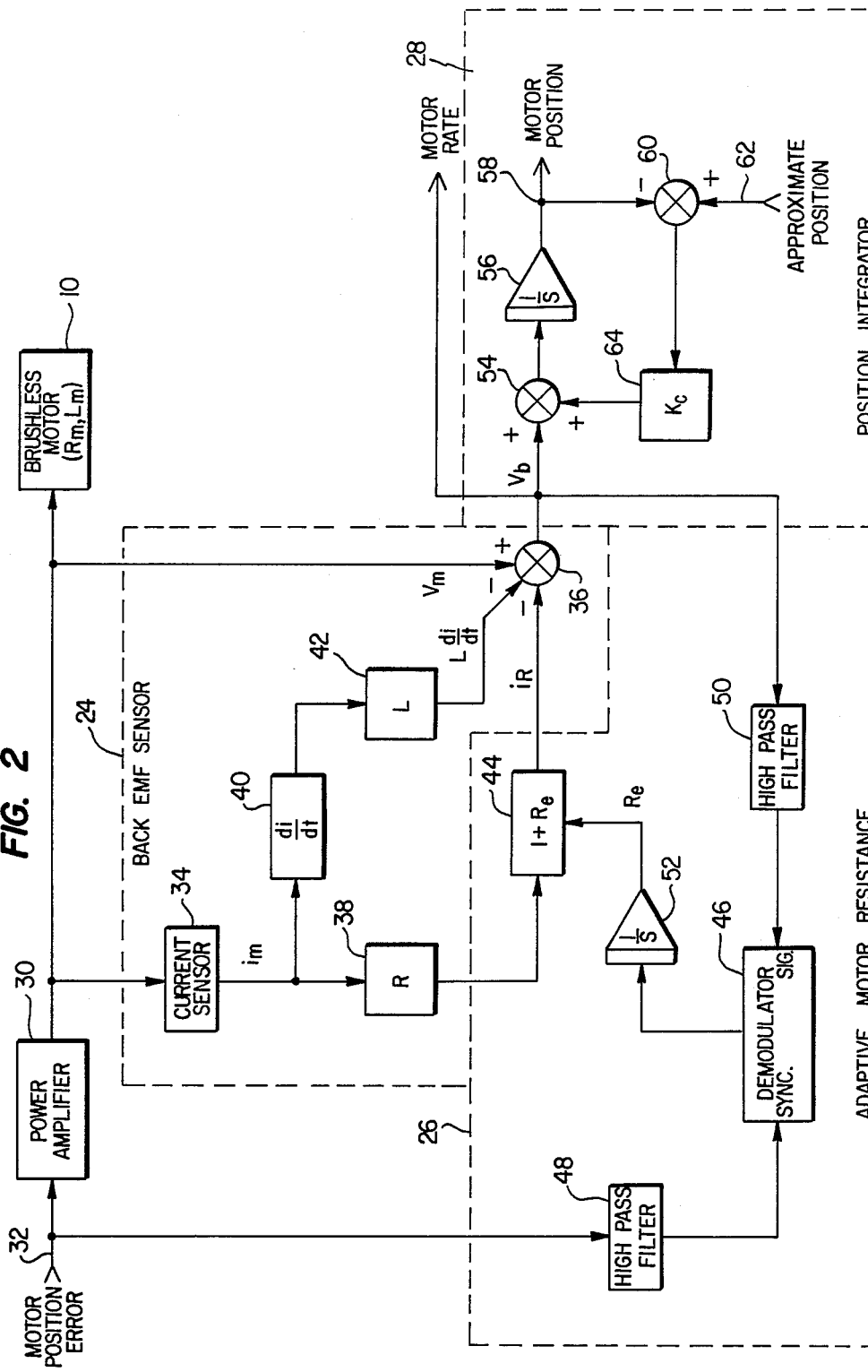
FIG. 2 is a block diagram of a back emf position control system for generating a motor rate and position signal.

Referring to FIG. 2, there is shown a block diagram for the control system to generate the drive signal to the brushless motor 10. The control system includes three identifiable sections including a back emf sensor 24, an adaptive motor resistance circuit 26, and a position integrator 28. The drive voltage for the brushless motor 10 is provided at the output of a power amplifier 30 that receives a motor position error signal on a line 32 from a conventional control circuit (not shown). Also connected to the output of the power amplifier 30 is a current sensor 34 and a summing junction 36, both component parts of the back emf sensor 24. The current sensor, as the name implies, responds to the current in the brushless motor 10 to generate at an output a current signal, $i_m$, as one variable for computing the back emf of the motor 10. A second variable, $v_m$, for computing the back emf voltage is applied to the summing junction 36 from the output of the power amplifier 30.

Connected to the output of the current sensor 34 is a resistance gain network 38 and a differentiator 40. The gain network 38 is set at a value to represent the static measured resistance of the motor 10. The output of the network 38 is a motor signal, iR, that is, a voltage representing the motor resistance multiplied by the motor current. Because the true motor resistance will vary widely over its operating temperature range, the resistance gain must be adaptively trimmed throughout system operation. This adaptive trimming of the output of the gain network 38 is a function of the adaptive motor resistance circuit 26 to be described.

In the differentiator 40 the time differential of the motor current, $i_m$, is taken with respect to time and the output is applied to an inductance gain network 42. The inductance network 42 is set with a fixed gain based upon the measured inductance of the motor 10. This inductance remains relatively constant through the motor life and over the environmental temperature range of motor operation. Thus, the output of the inductance gain network 42 is a signal L di/dt which represents another variable of the equation to compute the back emf of the motor 10. This voltage drop L di/dt from the gain network 42 is input to the summing junction 36 at an inverting terminal.

To adaptively trim the resistance voltage drop as output from the gain network 38 the output of the network 38 is input to a variable gain network 44 as part of the adaptive motor resistance circuit 26. An output of variable gain network 44 is the corrected motor resistance voltage, iR, applied to the summing junction 36. This signal from the variable gain network 44 is also input to an inverting terminal of the junction 36.

At the output of the summing junction 36 there is generated a computed back emf voltage in accordance with the expression:

$$V_b = V_m - (L\, di/dt + iR)$$

where $V_m$ = the applied motor voltage;
L di/dt = the motor inductance voltage drop; and
iR = the motor current voltage drop.

This computed back emf voltage is input to the position integrator which produces the motor position output. The output of the summing junction 36 is also the motor rate output of the system.

Figure 3A:
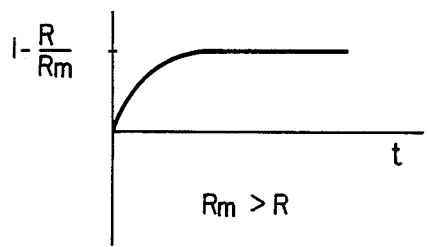
FIG. 3A through 3D illustrates transient responses to a motor voltage step input to the control system of FIG. 2.
Figure 3B:
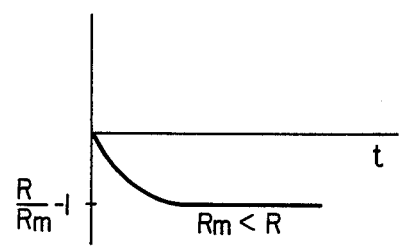
Figure 3C:
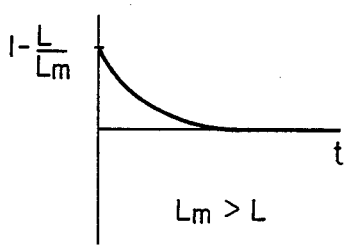
Figure 3D:
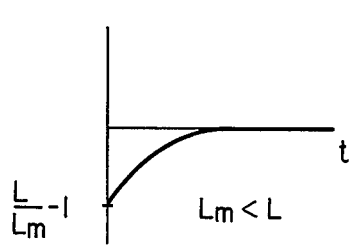

For proper operation of the control system of the present invention substantially precise values of motor inductance and motor resistance must be known. Mismatches between circuit gains for the inductance and resistance (gain network 42 and gain network 38, respectively) and the actual motor values of inductance and resistance ($L_m$ and $R_m$) will lead to transient errors. Referring to FIGS. 3A through 3D, there is shown plots of the transient errors for both motor resistance, $R_m$, and motor inductance, $L_m$. These transient errors are illustrated for a motor voltage step input from the power amplifier 30. FIGS. 3A and 3B show the transient errors for such a step voltage input for a motor resistance, $R_m$, greater than (FIG. 3A) or less than (FIG. 3B) the gain set in the network 38. FIGS. 3C and 3D show transient errors for motor inductance, $L_m$, greater than (FIG. 3C) or less than (FIG. 3D) the gain set in the network 42. It will be apparent from FIGS. 3A and 3B that a variance between the gain setting of the network 38 and actual motor resistance introduces an error into the computed back emf. To correct this error the adaptive motor resistance circuit generates an effective resistance gain signal input to the variable gain network 44.

The adaptive motor resistance circuit 26 continuously updates the resistance gain by demodulating the transient error shown in FIGS. 3A or 3B. This demodulation is carried out by means of a demodulator 46 that receives at a "sync" terminal the motor position signal at terminal 32. This motor position signal is filtered prior to connection to the "sync" terminal by means of a high pass filter 48. The computed back emf voltage from the summing junction 36 is also applied to the demodulator 46 through a high pass filter 50. The demodulated output of the demodulator 46 is slowly integrated by means of an integrator 52 to generate the effective resistance gain, $R_e$, as a variable gain factor to the variable gain network 44.

The signal path through the summing junction 36, the high pass filter 50, the demodulator 46, the integrator 52 and the variable gain network 44 constitute a long time constant, negative feedback loop. This loop tends to minimize transient errors as illustrated in FIGS. 3A and 3B by adjusting the output of the gain network 38 to match the true motor resistance. The high pass filtering of the back emf voltage from the summing junction 36 substantially eliminates the DC voltage level associated with the relatively long motor mechanical time constant, while passing the transient signal caused by circuit gain errors. Similarly, the high pass filter 48 in the line with the demodulator "sync" input, substantially eliminates the motor position error DC voltage while passing only those motor position commands approaching a step input to selectively trigger the demodulator 46.

With the back emf sensor 24 and the adaptive motor resistance circuit 26 functioning as described, the summing junction 36 outputs a computed back emf voltage that is directly proportional to motor velocity and this output can be directly used as a servo rate (motor rate) feedback signal. By electronically integrating the velocity signal, a motor position output is obtained as a signal suitable for servo position loop closure. Such a signal would be a feedback to the control circuit providing the motor position error signal on the line 32. This motor position signal is output from the position integrator 28.

In the position integrator 28, the output of the summing junction 36 is input to a summing junction 54 and the output of the summing junction 54 is input to an integrator 56 that functions to integrate the back emf voltage into a motor position signal which is output at a terminal 58.

The integrator 56 slowly drifts due to small circuit offsets. Offset errors between the integrated motor position output and the true position alignment are corrected by feeding back to the summing junction 54 a signal representing the difference between an approximate position signal and the integrated motor position signal. Connected to the output of the integrator 56 is a summing junction 60 that also receives an approximate position signal at terminal 62. As discussed previously, this approximate position signal may come from an LVDT, although many other control circuits have information available which is suitable for use as the approximate position signal. For example, motor current is nearly proportional to motor position in a system where motor force is countered by a linear spring force. Another example is that piston velocity will be closely proportional to control valve motor position in a hydraulic actuation system, such as illustrated in FIG. 1.

An output from that summing junction 60, which is the difference between the motor position signal from the integrator 56 and the approximate positions signal at the terminal 62 is input to a gain network 64. The gain factor, $K_c$, is set low enough to minimize the influence of the approximate position input, but high enough to balance circuit offsets. An output of the gain network 64 is summed with the output of a summing junction 36 in the summing junction 54. Thus the input to the integrator 56 is a computed back emf voltage as corrected by the output of the gain network 64.

By operation of the control system of FIG. 2, the need for feedback transducers on limited motion position control servo using DC motors is minimized. This system is generally applicable to all cases where system state information is available to give a rough approximation of the motor position. As described, the control system of FIG. 2 extracts the motor back emf voltage from the applied motor voltage and motor current. Motor position output is obtained by integrating the back emf voltage and an approximate position signal.

Although the invention has been described in detail, the same is by way of illustration and example only and is not to be taken by way of limitation, the spirit and scope of the invention being limited only to the terms of the appended claims.

I claim:

1. A control system for back emf position loop closure for a DC motor, comprising:
   a back emf sensor responsive to signals representing applied motor voltage, measured motor inductance, and continuously corrected motor-resistance for generating a computed back emf voltage;
   adaptive motor-resistance means coupled to the back emf sensor for utilizing the computed back emf voltage to generate the continuously corrected motor-resistance to said back emf sensor; and
   position integrator means responsive to the computed back emf voltage and an approximate motor position signal to generate an output signal varying with the relative motor position.

2. A control system for back emf position loop closure as set forth in claim 1 wherein said back emf sensor includes a motor-resistance gain network set at a value to represent the static measured resistance of the motor.

3. A control system for back emf position loop closure as set forth in claim 2 wherein said adaptive motor-resistance means includes a variable gain network for automatically adjusting the motor resistance gain to substantially equal the actual motor resistance.

4. A control system for back emf position loop closure as set forth in claim 3 wherein said adaptive motor-resistance means includes a long time-constant negative feed back loop to minimize transient error in the resistance gain adjustment.

5. A control system for back emf position loop closure as set forth in claim 1 wherein said adaptive motor-resistance means includes means responsive to a motor position signal and the computed back emf voltage to generate the corrected motor resistance to said back emf sensor.

6. A control system for back emf position loop closure as set forth in claim 5 wherein said adaptive motor-resistance means includes:
   a demodulator responsive to the motor position signal and the computed back emf voltage to generate a resistance gain signal; and
   a variable gain network responsive to a signal representing static motor-resistance and the resistance gain signal to generate the corrected motor resistance to said back emf sensor.

7. A control system for back emf position loop closure as set forth in claim 6 wherein said adaptive motor-resistance means further includes means for integrating the resistance gain signal prior to application to said variable gain network.

8. A control system for back emf position loop closure for a DC motor, comprising:
   a back emf sensor responsive to signals representing applied motor voltage, measured motor inductance, and continuously corrected motor-resistance for generating a computed back emf voltage;
   adaptive motor-resistance means responsive to a motor position drive signal, the computed back emf voltage, and a voltage signal based upon the static motor-resistance to generate the corrected motor-resistance signal to said back emf sensor; and
   position integrator means responsive to the computed back emf voltage and an approximate motor position signal to generate an output varying with the relative motor position.

9. A control system for back emf position loop closure as set forth in claim 8 wherein said computed back emf voltage represents a motor rate signal.

10. A control system for back emf position loop closure as set forth in claim 8 wherein:
    said back emf sensor includes a resistance gain network generating an iR motor voltage based upon the static resistance of the motor; and
    said adaptive motor-resistance means includes means for generating a resistance gain signal, and a variable gain network responsive to the iR motor voltage from said back emf sensor and the resistance gain signal to generate the corrected motor-resistance signal to said back emf sensor.

11. A position control system for back emf position loop closure as set forth in claim 10 wherein said adaptive motor-resistance means includes a demodulator responsive to the motor position drive signal and the computed back emf voltage to generate the resistance gain signal.

12. A control system for back emf position loop closure as set forth in claim 11 wherein said adaptive motor-resistance means includes means for filtering the computed back emf voltage before said demodulator to minimize the effects of the relatively long mechanical time-constant of the motor while passing transient signals caused by circuit gain errors.

13. A control system for back emf position loop closure as set forth in claim 12 wherein said adaptive motor-resistance means further includes means for filtering the motor position drive signal to minimize the motor position error and pass only those signal commands approaching a step function.

14. A control system for back emf position loop closure for a DC motor comprising:
 a back emf sensor responsive to an applied motor voltage for subtracting a continuously corrected motor iR voltage and a motor L di/dt voltage based upon the measured inductance of the motor from the applied motor voltage to generate a computed back emf voltage;
 a motor resistance circuit responsive to a motor position signal, the computed back emf voltage and a motor iR voltage based upon the static resistance of the motor to generate the corrected motor iR voltage; and
 position integrator means responsive to the computed back emf voltage and an approximate motor position signal to generate an output signal varying with the relative motor position.

15. A control system for back emf position loop closure as set forth in claim 14 wherein said back emf sensor includes a current sensing network responsive to the applied motor voltage for generating a motor control signal, $i_m$, representing the current in the DC motor, a differentiator coupled to the current sensing network for generating a signal varying with the derivative of motor current with respect to time, and an inductance gain network having a fixed gain based upon the measured inductance of the motor and responsive to the derivative signal of motor current for generating the motor L di/dt voltage, and a resistance gain network set at a value to represent a measured static resistance of the motor and responsive to the motor current signal for generating the motor iR signal to said motor resistance circuit.

16. A control system for back emf position loop closure as set forth in claim 15 wherein said motor resistance circuit includes means for generating a resistance gain signal, and a variable gain network responsive to the motor iR signal and the resistance gain signal to generate the corrected motor iR voltage to said back emf sensor.

17. A control system for back emf position loop closure as set forth in claim 16 wherein said position integrator means includes an integrator responsive to the computed back emf voltage for generating the output signal varying with the relative motor position.

18. A control system for back emf position loop closure as set forth in claim 17 wherein said position integrator means further includes means for correcting offset errors of said integrator.

* * * * *